United States Patent
Robert et al.

(10) Patent No.: US 7,114,182 B2
(45) Date of Patent: Sep. 26, 2006

(54) STATISTICAL METHODS FOR DETECTING TCP SYN FLOOD ATTACKS

(75) Inventors: Jean-Marc Robert, Ottawa (CA); Brett Howard, Nepean (CA); Paul Kierstead, Ottawa (CA); Scott David D'Souza, Ottawa (CA)

(73) Assignee: Alcatel Canada Inc., Kanata (CA)

( * ) Notice: Subject to any disclaimer, the term of this patent is extended or adjusted under 35 U.S.C. 154(b) by 810 days.

(21) Appl. No.: 10/158,116

(22) Filed: May 31, 2002

(65) Prior Publication Data

US 2003/0226035 A1    Dec. 4, 2003

(51) Int. Cl.
*G06F 11/22*   (2006.01)
*H04L 9/00*    (2006.01)

(52) U.S. Cl. ............................ 726/23; 726/11; 713/153
(58) Field of Classification Search ................... 726/11, 726/23; 713/153
See application file for complete search history.

(56) References Cited

U.S. PATENT DOCUMENTS

| | | | | |
|---|---|---|---|---|
| 5,958,053 A | | 9/1999 | Denker | 713/201 |
| 6,321,338 B1* | | 11/2001 | Porras et al. | 726/25 |
| 6,708,212 B1* | | 3/2004 | Porras et al. | 709/224 |
| 6,772,334 B1* | | 8/2004 | Glawitsch | 713/153 |
| 2002/0031134 A1 | | 3/2002 | Poletto et al. | |

FOREIGN PATENT DOCUMENTS

WO    WO 02/21244 A2    3/2002

\* cited by examiner

*Primary Examiner*—Emmanuel L. Moise
*Assistant Examiner*—Ali Abyaneh
(74) *Attorney, Agent, or Firm*—Marks & Clerk; S. Mark Budd

(57) ABSTRACT

Methods of detecting TCP SYN flooding attacks at a router located between a LAN and a network such as the Internet are described. The methods rely on a counting arrangement in which SYN and Fin packets are counted on both the LAN side and the network or Internet side of the router during a time interval. Weighting factors are applied to each count, the factor for the LAN side count having the opposite polarity to the factor for the network side count. The absolute values of the sums of the weighting factors of like polarity are equal. An abnormal number of unsuccessful connection attempts are determined based on a parameter calculated using the weighting factors in conjunction with the respective counts.

16 Claims, 2 Drawing Sheets

STATISTICAL METHODS FOR DETECTING TCP SYN FLOOD ATTACKS

FIELD OF THE INVENTION

This invention relates, generally, to computer based systems and more particularly to methods of detecting security related attacks in such systems.

BACKGROUND

Attacks on web sites in recent years has resulted in severe disruption in network services. These attacks can take any one of a number of forms including, but not limited to, SYN flooding.

In a SYN flooding attack an attacker overloads a victim's site to the point where it cannot cope with incoming traffic. Such an attack, typically, focuses on an inherent characteristic of TCP based services.

Essentially, TCP services rely on a three-way hand shaking protocol on connection set up. A client wishing to make connection with a host sends a synchronization signal (SYN) to the host and the host responds to the client with a SYN acknowledgement (ACK) reply. The client then returns an acknowledgement and the connection is established. The handshaking protocol is illustrated in FIG. 1.

Upon completion of a connection the client forwards a finish (FIN) packet to the host indicating that there will be no further data or packets directed to the host and the connection is thereafter closed.

In a SYN flooding attack the attacker will typically use a false or invalid source address such that when the host returns the SYN/ACK message it does not reach a valid client. Under the TCP protocol the host stores half opened connections i.e. connections for which the third leg of the three way protocol has not been completed for a set period of time or until a system time out occurs. If, during this time interval multiple new half opened connections are established at the host site the memory allocated to retaining such connections becomes swamped and eventually is unable to receive any more SYN packets. At this stage the server or host will crash or will not respond to any new connections and the site goes out of service. Because the host is unable to receive further data the attacker has been successful in generating what is known as a denial of service attack. Denial of service attacks have become an increasingly prevalent form of a security threat and the problem, so far, has been quite difficult to solve. Several countermeasures have been proposed and can be characterized as firewall and router filtering, operating system improvements, protocol improvements and intrusion detection.

Considerable prior art exists in the area of security attacks and the problem is well described in a publication by C. Schuba, I. Krsul, M. Kuhn, E. Spafford, A. Sundaram and D. Zamboni entitled "Analsyis of a denial of service attack on TCP", published in the Proc., 1997 IEEE Symp. Security and Privacy. The Schuba et al. paper describes the problem and the classical solutions for a proxy service: the TCP relay and the semitransparent TCP gateway. In those two solutions, a fire wall intercepts the TCP connections, maintains the states of the TCP state machine and introduces new packets to avoid the attacks.

The proxy solutions according to this publication have to maintain, for each connection, the states of the corresponding TCP state machine. This mechanism needs a lot of resources and can be itself the target of a new denial of service attack. Thus, the high cost of the computation overhead makes this solution inappropriate for network routers or switches.

A second prior art solution which is closer to the present invention is described by H. Wang, D. Zhang and K. G. Shin, "Detecting SYN flooding attacks", Proc. Infocom 2002. The method according to Wang et al. relies on a counting argument on the SYN and FIN packets on the TCP connections. Those packets should go in pairs in any well behaved connection. Thus, the number of SYN packets should match roughly the number of FIN packets. The simplicity of this method lies in the stateless and low computation overhead which makes the detection mechanism itself immune to flooding attacks. This simplicity allows the detection to be performed in the leaf routers that connect end hosts to the Internet.

The counter mechanism according to Wang et al. has a major drawback. If attackers know exactly the detection protocol described by this method they may thwart this approach simply by overflooding the routers with synchronized SYN and unrelated, over even invalid FIN packets. Hence the SYN counter and the FIN counter would be roughly the same. However, the victim's TCP/IP stack would be open to many half-opened connections that would not be closed by the invalid FIN packets. This corresponds to the original denial of service attack.

U.S. Pat. No. 6,321,338 which issued Nov. 20, 2001 to Porras et al. and entitled "Network Surveillance", also provides prior art for this technology. According to the Porras et al. patent there is provided a method of network surveillance including receiving network packets handled by a network entity and building at least one long term and at least one short term statistical profile from a measure of the network packets that monitors data transfers, errors or network connections. A comparison of the statistical profiles is used to determine whether the difference between the statistical profiles indicates suspicious network activity.

This patent further discloses, in addition to the details mentioned above, that intensity measures of event streams e.g. ICMP packets, are particularly suited for detecting flooding attacks. Furthermore, the patent discloses that intensity measures that correlate SYN to SYN _ACK messages, volume analysis of SYN/RST messages or TCP/FIN messages are useful to detect port availability or scanning attacks.

SUMMARY OF THE INVENTION

The present invention belongs to the router-detecting category that could also be implemented in fire walls and operating systems.

The invention relies on a counting argument as discussed above but in the present case the counting argument is based on the following three properties:

1. The incoming packets from the attacker side would have a positive impact on the detection parameters. The incoming packets from the opposite direction may have a positive or a negative impact on the detection parameters;
2. The counter argument is weighted in such a way that any partial attack would have a positive impact on the detection parameters. Only a fully completed and valid connection would have no impact on the detection parameters.
3. The sum of the weighted factors associated to SYN and FIN in one direction plus the sum of the weighted factors associated to SYN/ACK and FIN in the other direction is zero.

Therefore in accordance with a first aspect of the present invention there is provided a method of detecting an abnormal number of unsuccessful connection attempts in a router located between a LAN and a network in a communications system, the method comprising the steps: a) counting SYN, SYN/ACK and FIN packets arriving on the LAN side of the router during a predetermined time interval; b) counting SYN, SYN/ACK and FIN packets arriving on the network side of the router during the predetermined time interval; c) multiplying each count by a respective weighting factor, wherein: i) the weighting factor of the count in step a) is positive; and ii) the sum of the weighting factors associated to SYN and FIN in one direction plus the sum of the weighting factors associated to SYN/ACK and FIN in the other direction is zero; d) calculating a parameter that equals the sum of the products of step c); and e) determining that an abnormal number of unsuccessful connection attempts has occurred responsive to the behavior defined in step d) over successive time intervals.

In accordance with a second aspect of the present invention there is provided a method of detecting an abnormal number of unsuccessful connection attempts in a router located between a LAN and a network in a communications system, the method comprising the steps: a) counting SYN, SYN/ACK and FIN packets arriving on the network side of the router during a predetermined time interval; b) counting SYN, SYN/ACK and FIN packets arriving on the LAN side of the router during the predetermined time interval; c) multiplying each count by a respective weighting factor, wherein: i) the weighting factor of the count in step a) is positive; and ii) the sum of the weighting factors associated to SYN and FIN in one direction plus the sum of the weighting factors associated to SYN/ACK and FIN in the other direction is zero; d) calculating a parameter that equals the sum of the products of step c); and e) determining that an abnormal number of unsuccessful connection attempts has occurred responsive to the behavior defined in step d) over successive time intervals.

There is also provided a method of detecting an abnormal number of unsuccessful connection attempts in a router located between a LAN and a network in a communications system, in which the method includes the steps: a) counting SYN, SYN/ACK and RST packets arriving on the LAN side of the router during a predetermined time interval; b) counting SYN, SYN/ACK and RST packets arriving on the network side of the router during the predetermined time interval; c) multiplying each count by a respective weighting factor, wherein: i) the weighting factor of the count in step a) is positive; ii) the sum of the weighting factors associated to SYN and FIN in one direction plus the sum of the weighting factors associated to SYN/ACK and FIN in the other direction is zero; and iii) the weighting factor associated to RST packets is the same as the one associated to FIN packets in the same direction; d) calculating a parameter that equals the sum of the products of step c); and e) determining that an abnormal number of unsuccessful connection attempts has occurred responsive to the behavior defined in step d) over successive time intervals.

BRIEF DESCRIPTION OF THE DRAWINGS

The invention will now be described in greater detail with reference to the attached drawings wherein.

DETAILED DESCRIPTION OF THE INVENTION

Figure 1:
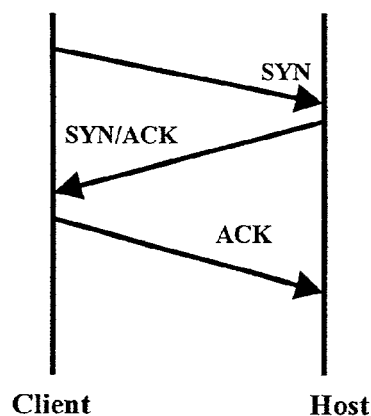
FIG. 1 illustrates the TCP handshaking protocol.

As shown in FIG. 1 the TCP connection protocol involves a three-way communication.

At the end of a connection request the client sends a FIN packet to the host which acknowledges receipt of the FIN packet and the client then responds to the host to close the connection. As indicated previously failure to complete the initiating handshake leaves the host also known in here as the victim in a vulnerable position to a SYN flooding attack.

Figure 2:
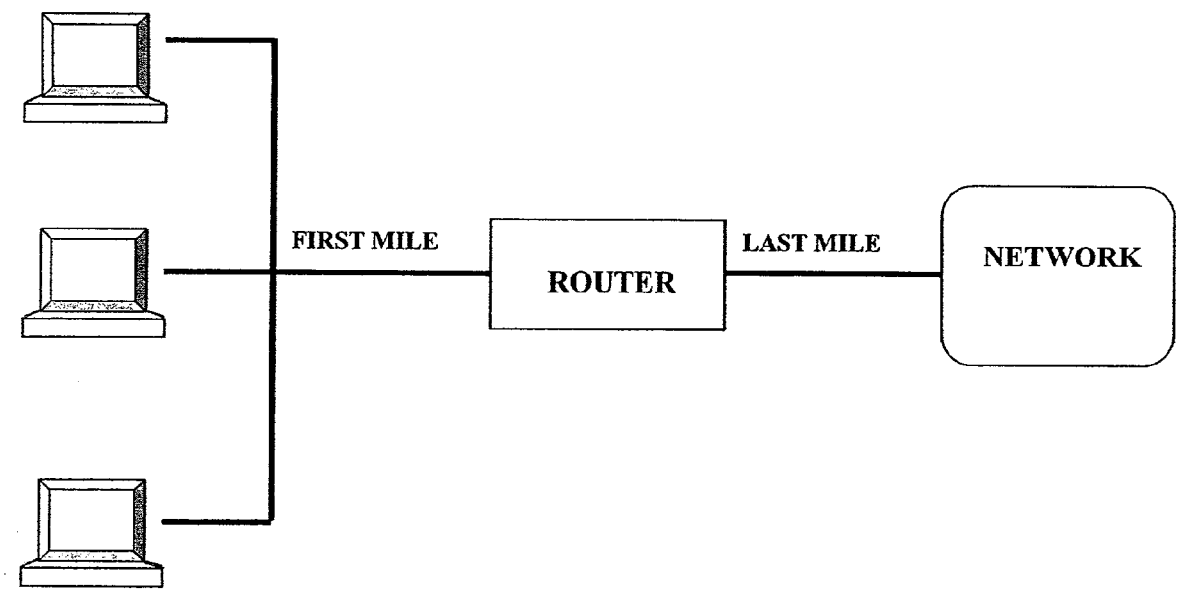
FIG. 2 is a high level diagram of a computer based system according to the invention.

As noted previously the present invention relates to a router detecting technique wherein the detection methods are implemented at the router. As shown in FIG. 2 the router is typically located between the local area network (LAN) and the network or Internet. The connection between the LAN and the router is considered to be the first mile router and the last mile router with respect to the network. As a first mile router, the router detects attacks coming from within the LAN at an early stage. As a last mile router, the router detects attacks coming from the network against victims within the LAN.

In the implementation of the present invention, as indicated previously incoming packets from the LAN and the incoming packets from the Internet are treated differently. According to the following discussion $\#SYN_{LAN}$, $\#SYN/ACK_{LAN}$ and $\#FIN_{LAN}$ are defined as the number of SYN packets, the number of SYN/ACK packets and the number of FIN packets received from the LAN respectively. Similarly, $\#SYN_{NET}$, $\#SYN/ACK_{NET}$ and $\#FIN_{NET}$ corresponds to the number of packets received from the network. For the purpose of calculating whether an abnormal number of unsuccessful connection attempts are received for the first mile router consider the following equation:

$$F = a\#SYN_{LAN} + b\#SYN/ACK_{LAN} + c\#FIN_{LAN} - d\#SYN_{NET} - e\#SYN/ACK_{NET} - f\#FIN_{NET}$$

where

F=the calculated parameter a, b, c, d, e and f are weighting factors.

Examples of factors respecting the three properties previously discussed are:
  i) a=b=f=2 and c=d=e=1;
  ii) a=4, b=3, c=1, d=1, e=2 and f=3;
  iii) a=f=1, d=−1 and b=c=e=0.

It will be apparent from the above that any attack coming from within the LAN would increase the value of F. Even if the internal and any collaborate of attackers within the LAN know the protocol they would not be able to have a negative impact on the parameter F.

Similarly, if the parameter is for the last mile router the formula for detecting attacks coming from the network will take the following form:

$$L = a\#SYN_{NET} + b\#SYN/ACK_{NET} + c\#FIN_{NET} - d\#SYN_{LAN} - e\#SYN/ACK_{LAN} - f\#FIN_{LAN}$$

where

L=the calculated parameter for the last mile router a, b, c, d, e and f are weighting factors.

The examples of weighting factors given above will still apply.

Any attack coming from within the network would increase significantly the parameter L. Even if the external and collaborative attackers know the protocol they would not be able to have a negative impact on the value of the parameter L.

It is to be noted that the aforementioned equations are not unique. They are a simple instantiation of the aforementioned properties 1, 2 and 3.

Figure 3A:
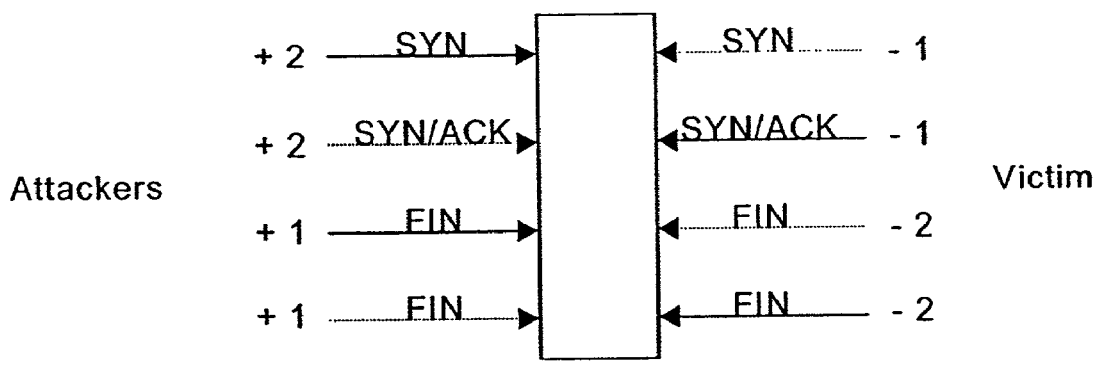
FIG. 3A shows one implementation of the inventive concept.
Figure 3B:
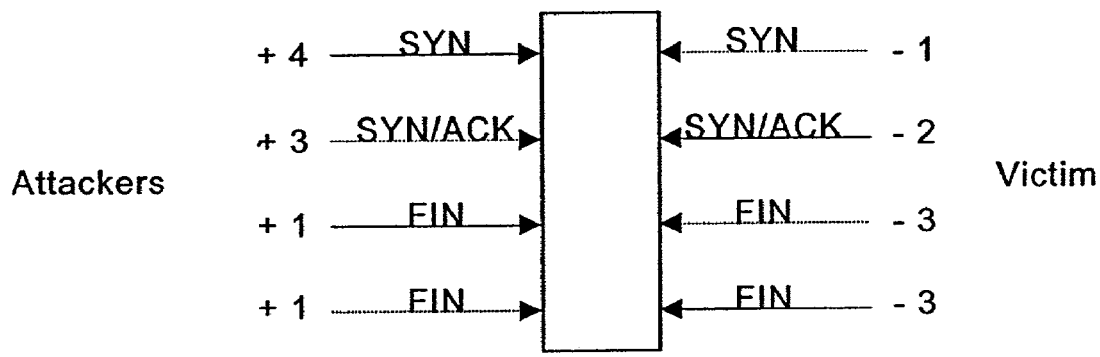
FIG. 3B shows a second instance according to the present invention.

FIGS. 3A and 3B provide examples of the weighting factors.

It is to be noted that in a first aspect of the invention the SYN, SYN/ACK and FIN packets arriving at the LAN side of the router are counted during a predetermined time interval while the SYN, SYN/ACK and FIN packets arriving on the network side of the router are counted during the same interval. Each of these counts are multiplied by a respective weighting factor, the weighting factors of the packets coming from the attacking side being positive. The sum of the weighted factors associated to SYN and FIN packets in one direction plus the sum of the weighted factors associated to SYN/ACK and FIN packets in the other direction is zero. The parameters (F/L) are calculated to equal the sum of the products of the multiplying step. Finally, it is determined whether an abnormal number of unsuccessful connection attempts have occurred responsive to the behavior of the parameter defined in the calculated step over the successive time intervals.

According to the TCP protocol, reset (RST) packets should be used to respond to abnormal situations, e.g. a packet arriving to a closed port. However, some applications respond to the active closing FIN packets with RST packets instead of passive closing packets—for performance reasons. Therefore, to address this problem, RST packets may have to be considered equivalent to FIN packets in some cases.

The predetermined time intervals are typically sliding windows of a continuous or non-overlapping form.

The determining step can further comprise the use of any one of cumulative sum, moving average or filter derivative to detect changes in the parameter (L/F).

The present invention provides a means of detecting denial of service attacks that is more efficient and robust then known methods. Placing this invention in, for example, routing and switching products will, inherently, enhance the level of security that they provide to a network. The invention will also fine application in edge IP equipment, firewalls, hosts, etc.

While specific embodiments of the invention have been described and illustrated it will be apparent to one skilled in the art that numerous changes can be made to the basic concept. It is to be understood, however, that changes will, to the extent possible, fall within the full scope of the invention as defined by the appended claims.

We claim:

1. A method of detecting an abnormal number of unsuccessful connection attempts in a router located between a LAN and a network in a communications system, the method comprising the steps:
   a) maintaining a count of SYN packets, a count of SYN/ACK packets, and a count of FIN packets, for packets arriving on the LAN side of the router during a predetermined time interval;
   b) maintaining a count of SYN packets, a count of SYN/ACK packets, and a count of FIN packets, for packets arriving on the network side of the router during the predetermined time interval;
   c) multiplying each count by a respective weighting factor, wherein:
      i) the weighting factor associated with each count in step a) is positive;
      ii) the sum of the weighting factors of any partial connection coming from the attacking side is positive; and
      iii) the sum of the weighting factors associated with the counts of SYN and FIN packets in one direction plus the sum of the weighting factors associated with the counts of SYN/ACK and FIN in the other direction is zero;
   d) calculating a parameter that equals the sum of the products of step c), the parameter for detecting attacks; and
   e) determining that an abnormal number of unsuccessful connection attempts has occurred responsive to the behavior defined in step d) over successive time intervals.

2. The method as defined in claim 1 wherein each of the weighting factors takes on a unique value, the conditions of step c) being maintained.

3. The method as defined in claim 2 wherein the predetermined time intervals are one of continuous or non-overlapping sliding windows.

4. The method as defined in claim 1 wherein step e) further comprises using any one of cumulative sum, moving average or filtered derivative to detect changes in the parameter.

5. The method as defined in claim 1 wherein the equation for detecting the LAN side originating attacks has the form:

$$F = x\#SYN_{LAN} + x\#SYN/ACK_{LAN} + \#FIN_{LAN} - \#SYN_{NET} - \#SYN/ACK_{NET} - x\#FIN_{NET};$$

where F is the parameter detecting attacks from the LAN;
X is the weighting factor;
$\#SYN_{LAN}$ is the number of SYN packets arriving at the LAN side;
$\#SYN/ACK_{LAN}$ is the number of SYN/ACK packets arriving on the LAN side
$\#FIN_{LAN}$ is the number of FIN packets arriving at the LAN side;
$\#SYN_{NET}$ is the number of SYN packets arriving at the network side; and
$\#SYN/_{ACK}$ is the number of SYN/ACK packets arriving at the network side; and
$\#FIN_{NET}$ is the number of FIN packets arriving at the network side.

6. The method as defined in claim 1 wherein the equation for detecting the network side originating attacks has the form:

$$L = x\#SYN_{NET} + x\#SYN/ACK_{NET} + \#FIN_{NET} - \#SYN_{LAN} - \#SYN/ACK_{LAN} - x\#FIN_{LAN};$$

where L is the parameter detecting attacks from the network side; and
x is the weighting factor.

7. The method as defined in claim 1 wherein the equation for detecting a LAN side originating attack has the form:

$$F = \#SYN_{LAN} + \#SYN_{NET}$$

where F is the paramueter for detecting attacks from the LAN.

8. The method as defined in claim 1 wherein the equation for detecting the network side originating attack has the form:

$$L = \#SYN_{NET} + \#SYN_{LAN} - \#FIN_{LAN}$$

where L is the parameter for detecting attacks from the network side.

9. A method of detecting an abnormal number of unsuccessful connection attempts in a router located between a LAN and a network in a communications system, the method comprising the steps:
   a) maintaining a count of SYN packets, a count of SYN/ACK packets, a count of FIN packets, and a count of RST packets for packets arriving on the LAN side of the router during a predetermined time interval;
   b) maintaining a count of SYN packets, a count of SYN/ACK packets, a count of FIN packets, and a count of RST packets, for packets arriving on the network side of the router during the predetermined time interval;
   c) multiplying each count by a respective weighting factor, wherein:
      i) the weighting factor associated with each count in step a) is positive;
      ii) the sum of the weighting factors of any partial connection coming from the attacking side is positive; and
      iii) the sum of the weighting factors associated with the counts of SYN and FIN and RST packets in one direction plus the sum of the weighting factors associated with the counts of SYN/ACK and FIN and RST packets in the other direction is zero;
   d) calculating a parameter that equals the sum of the products of step c), the parameter for detecting attacks; and
   e) determining that an abnormal number of unsuccessful connection attempts has occurred responsive to the behavior defined in step d) over successive time intervals.

10. The method as defined in claim 9 wherein each of the weighting factors takes on a unique value, the conditions of step c) being maintained.

11. The method as defined in claim 10 wherein the predetermined time intervals are one of continuous or non-overlapping sliding windows.

12. The method as defined in claim 9 wherein step e) further comprises using any one of cumulative sum, moving average or filtered derivative to detect changes in the parameter.

13. The method as defined in claim 9 wherein the equation for detecting the LAN side originating attacks has the form:

$$F=x\#SYN_{LAN}x\#SYN/ACK_{LAN}+\#RST_{LAN}+\#FIN_{LAN}-\#SYN_{NET}-\#SYN/ACK_{NET}-x\#RST_{NET}-x\#FIN_{NET};$$

where F is the parameter for detecting attacks from the LAN;

X is the weighting factor;

$\#SYN_{LAN}$ is the number of SYN packets arriving at the LAN side;

$\#SYN/ACK_{LAN}$ is the number of SYN/ACK packets arriving on the LAN side $\#RST_{LAN}$ is the number of Reset packets arriving at the LAN side;

$\#FIN_{LAN}$ is the number of FIN packets arriving at the LAN side;

$\#SYN_{NET}$ is the number of SYN packets arriving at the network side; and $\#SYN/ACK_{NET}$ is the number of SYN/ACK packets arriving at the network side;

$\#RST_{NET}$ is the number of FIN packets arriving at the network side; and $\#FIN_{NET}$ is the number of FIN packets aniving at the network side.

14. The method as defined in claim 9 wherein the equation for detecting the network side originating attacks has the form:

$$L=x\#SYN_{NET}x\#SYN/ACK_{NET}+\#RST_{NET}+\#FIN_{NET}-\#SYN_{LAN}-\#SYN/ACK_{LAN}-x\#RST_{LAN}-x\#FIN_{LAN};$$

where L is the parameter for detecting attacks from the network side; and x is the weighting factor.

15. The method as defined in claim 9 wherein the equation for detecting a LAN side originating attack has tine form:

$$F=\#SYN_{NET}+\#SYN_{NET}-\#RST_{NET}-\#FIN_{LAN}$$

where F is the parameter for detecting attacks from the LAN.

16. The method as defined in claim 9 wherein the equation for detecting the network side originating attack has the form:

$$L=\#SYN_{NET}+\#SYN_{LAN}-\#RST_{LAN}-\#FIN_{LAN}$$

where L is the parameter for detecting attacks from the network side.

* * * * *

UNITED STATES PATENT AND TRADEMARK OFFICE
CERTIFICATE OF CORRECTION

| | | |
|---|---|---|
| PATENT NO. | : 7,114,182 B2 | Page 1 of 1 |
| APPLICATION NO. | : 10/158116 | |
| DATED | : September 26, 2006 | |
| INVENTOR(S) | : Jean-Marc Robert et al. | |

It is certified that error appears in the above-identified patent and that said Letters Patent is hereby corrected as shown below:

Col. 6 Claim 5 line 15: "#SYN/$_{ACK}$" should read --#SYN/ACK$_{NET}$--

Col. 6 Claim 7 line 3: "#SYN$_{NET}$" should read --#SYN$_{NET}$ - #FIN$_{NET}$--

Col. 8 Claim 13 line 3:
"x#SYN$_{LAN}$x#SYN/ACK$_{LAN}$" should read --x#SYN$_{LAN}$ + x#SYN/ACK$_{LAN}$--

Col. 8 Claim 14 line 4:
"x#SYN$_{NET}$x#SYN/ACK$_{NET}$" should read --x#SYN$_{NET}$ + x#SYN/ACK$_{NET}$--

Col. 8 Claim 15 line 3:
"#SYN$_{NET}$ + #SYN$_{NET}$ - #RST$_{LAN}$ - #FIN$_{LAN}$" should read
--#SYN$_{LAN}$ + #SYN$_{NET}$ - #RST$_{LAN}$ - #FIN$_{NET}$--

Signed and Sealed this

Thirtieth Day of January, 2007

JON W. DUDAS
*Director of the United States Patent and Trademark Office*